(12) United States Patent
Caffa et al.

(10) Patent No.: US 11,912,510 B2
(45) Date of Patent: Feb. 27, 2024

(54) DEVICE FOR GRIPPING CONTAINERS

(71) Applicant: FT SYSTEM SRL, Alseno (IT)

(72) Inventors: Marco Caffa, Cortemilia (IT); Marco Cipriani, Alpignano (IT); Francesco Lanzone, Turin (IT)

(73) Assignee: FT SYSTEM S.R.L., Alseno (IT)

( * ) Notice: Subject to any disclaimer, the term of this patent is extended or adjusted under 35 U.S.C. 154(b) by 744 days.

(21) Appl. No.: 17/048,128

(22) PCT Filed: Apr. 12, 2019

(86) PCT No.: PCT/IB2019/053024
§ 371 (c)(1),
(2) Date: Oct. 16, 2020

(87) PCT Pub. No.: WO2019/202447
PCT Pub. Date: Oct. 24, 2019

(65) Prior Publication Data
US 2021/0101758 A1 Apr. 8, 2021

(30) Foreign Application Priority Data
Apr. 16, 2018 (IT) .................. 102018000004584

(51) Int. Cl.
*B65G 47/90* (2006.01)
*B25J 9/00* (2006.01)
(Continued)

(52) U.S. Cl.
CPC ............ *B65G 47/90* (2013.01); *B25J 9/0093* (2013.01); *B65B 21/12* (2013.01); *B25J 11/0045* (2013.01); *B65G 2201/0247* (2013.01)

(58) Field of Classification Search
CPC ............ B65G 47/90; B65G 2201/0247; B25J 9/0093; B25J 11/0045; B65B 21/12
See application file for complete search history.

(56) References Cited

U.S. PATENT DOCUMENTS

| 2,899,232 A | 8/1959 | Walter, Jr. |
| 2,999,604 A | 9/1961 | Chalich |
(Continued)

FOREIGN PATENT DOCUMENTS

| CN | 101327851 A | 12/2008 |
| CN | 104552323 A | 4/2015 |
(Continued)

OTHER PUBLICATIONS

International Search Report and Written Opinion of the International Searching Authority dated Jul. 19, 2019 for International Patent Application No. PCT/IB2019/053024.

*Primary Examiner* — Stephen A Vu
(74) *Attorney, Agent, or Firm* — Howson & Howson LLP

(57) ABSTRACT

A device for gripping containers is provided. The device includes clamps adapted to clamp a container and a centring cone adapted to receive a cap of the container. The centring cone has a longitudinal axis and comprises an inlet mouth, for entrance of the cap, and an inner lateral surface. The inner lateral surface comprises a first, substantially cylindrical portion and a second portion comprised between the first portion and the inlet mouth and diverging outwards in the direction from the first portion to the inlet mouth. The centring cone is a component separate from and independent of the clamps.

10 Claims, 7 Drawing Sheets

(51) Int. Cl.
   *B65B 21/12*   (2006.01)
   *B25J 11/00*   (2006.01)

(56) References Cited

U.S. PATENT DOCUMENTS

| | | |
|---|---|---|
| 3,474,590 A | 10/1969 | Ganz |
| 3,856,343 A | 12/1974 | Muller |
| 3,881,763 A | 5/1975 | Benson |
| 3,948,552 A | 4/1976 | Hamrick |
| 4,121,868 A | 10/1978 | Pierce et al. |
| 4,395,069 A * | 7/1983 | Lebret ............... B66C 1/62 294/116 |
| 4,460,212 A * | 7/1984 | Montferme ........ B66C 1/62 294/115 |
| 4,941,699 A * | 7/1990 | Wilfong ............ B65G 47/90 294/902 |
| 5,851,042 A * | 12/1998 | Bankuty ............ B65G 47/90 294/203 |
| 6,257,636 B1 * | 7/2001 | Hovis ............... B66C 1/66 294/82.32 |
| 2012/0216906 A1 | 8/2012 | Clusserath et al. |
| 2015/0098782 A1 | 4/2015 | Lindauer |
| 2016/0107781 A1 | 4/2016 | Hutter et al. |
| 2016/0145090 A1 | 5/2016 | Fahldieck et al. |

FOREIGN PATENT DOCUMENTS

| | | |
|---|---|---|
| CN | 205418202 U | 8/2016 |
| CN | 104129521 A | 11/2017 |
| DE | 4416373 C1 | 8/1995 |
| DE | 20006237 U1 | 8/2000 |
| DE | 9321592 U1 | 11/2000 |
| DE | 20102782 U1 | 6/2001 |
| EP | 0497081 A2 | 8/1992 |
| EP | 1321366 A1 | 6/2003 |
| EP | 2368801 A1 | 9/2011 |
| EP | 2631190 A1 | 8/2013 |
| JP | H11-22754 A | 1/1999 |
| JP | 2005-88180 A | 4/2005 |
| JP | 2008-194770 A | 8/2008 |
| WO | 98/39213 A1 | 9/1998 |
| WO | 2013/186280 A1 | 12/2013 |

* cited by examiner

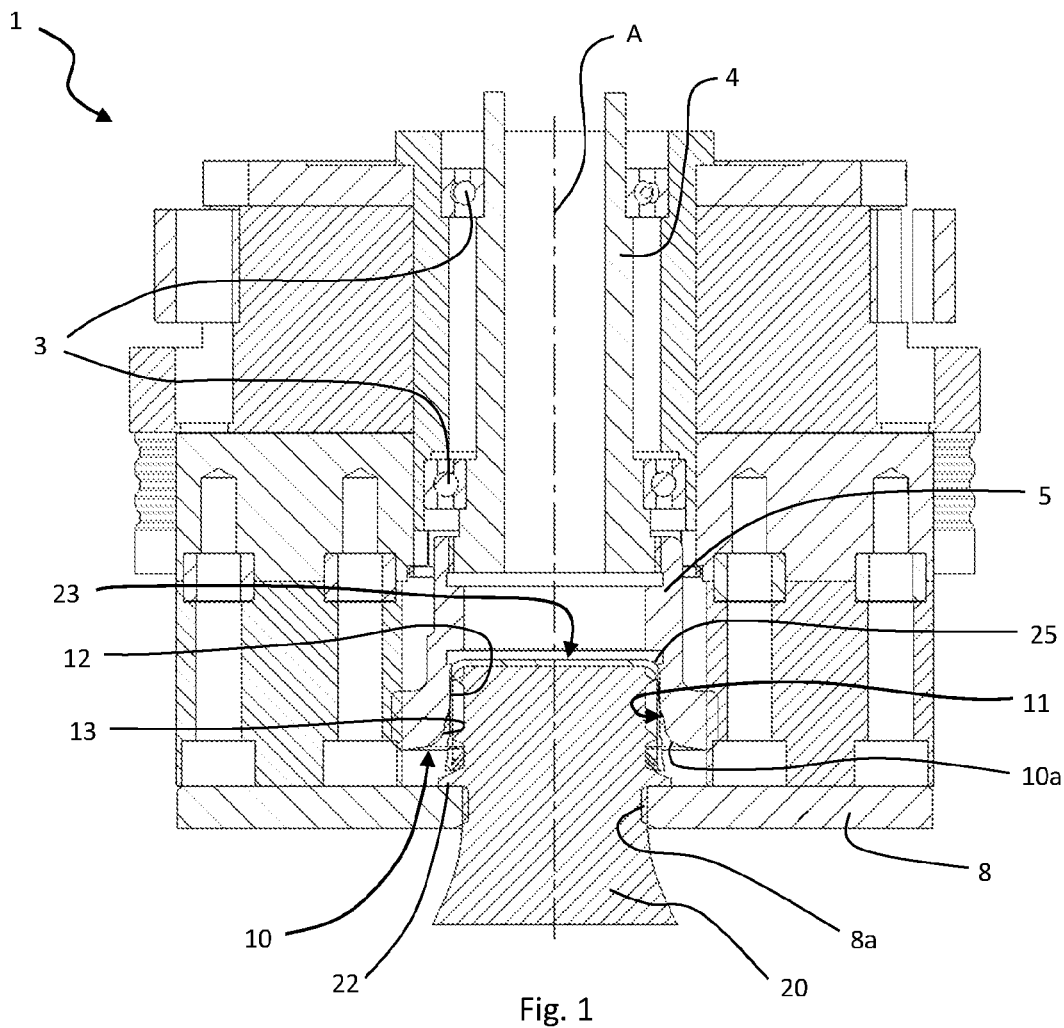
Fig. 1
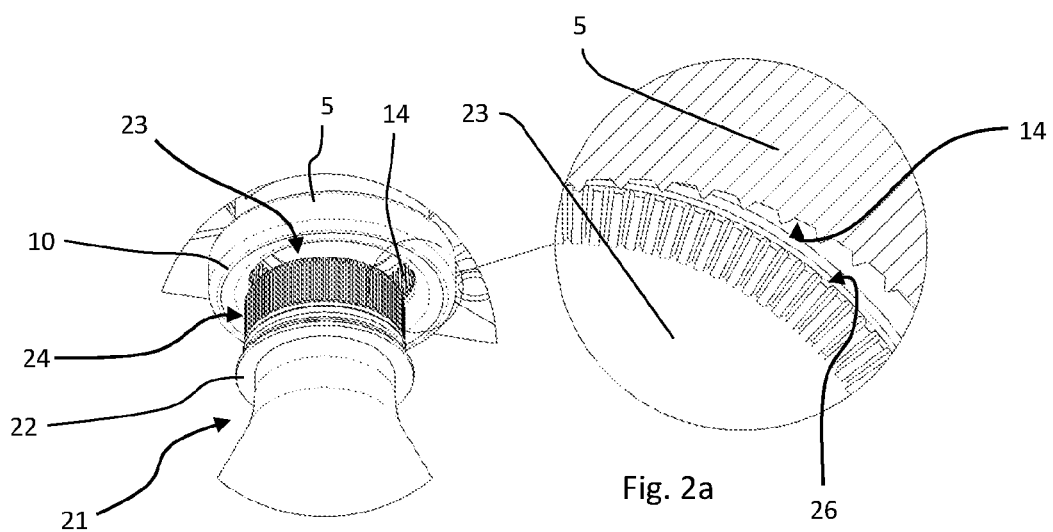
Fig. 2
Fig. 2a

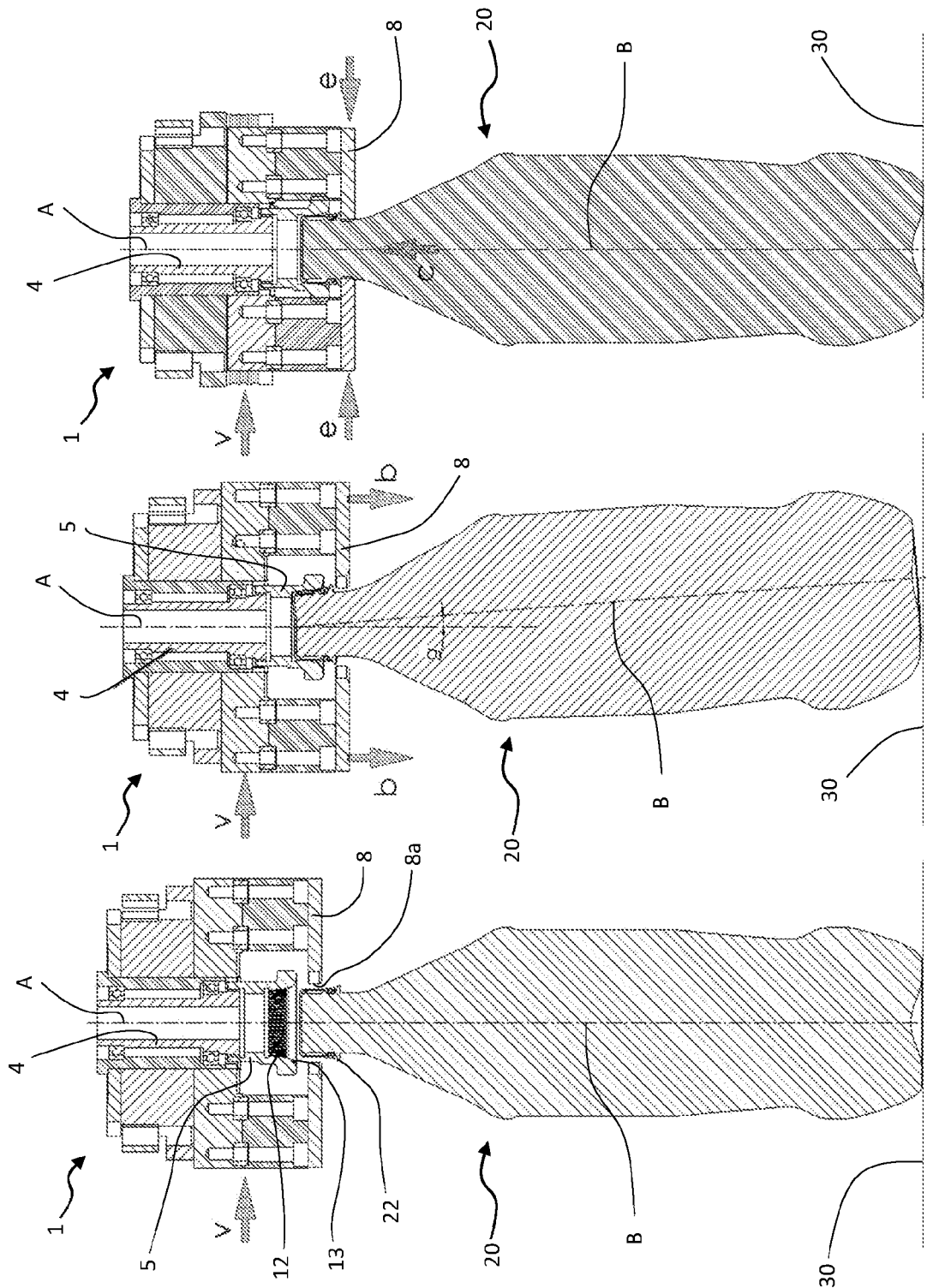

DEVICE FOR GRIPPING CONTAINERS

TECHNICAL FIELD

The present invention relates to a device for gripping containers on which a cap is applied.

The present invention further relates to a method of gripping and releasing containers, more particularly from/onto a conveyor belt.

The present invention finds particular application in the field of container handling.

PRIOR ART

In the field of container handling, more particularly of bottle handling, plants are known and widely used in which the bottles are advanced aligned along a conveying line consisting of one or more conveyor belts, which advance through a series of processing stations, comprising, for example, a filling station, a capping station, a labeling station, etc.

In these plants, there are situations in which some bottles must be taken from a conveyor belt in order to be transferred to other stations, or cases in which some bottles must be reinserted onto a conveyor belt. A typical example is the sampling of individual bottles from a conveyor belt so that they are transferred to inspection stations, where they are subjected to appropriate checks, and the subsequent reinsertion of the bottles onto a conveyor belt if, following the checks carried out, they are considered suitable.

The aforementioned requirement makes the operations of gripping the bottles from the conveyor belt and releasing the bottles onto the conveyor belt particularly critical. In particular, during the operation of gripping a bottle, it is important to avoid bumping or dropping other bottles that travel on the conveyor belt, while, during the release operation, it is important, besides avoiding bumping and dropping of other bottles, to reinsert the bottle by depositing it substantially orthogonal to the plane of the conveyor belt and at the same speed at which the conveyor belt advances.

Usually, in plants of the known type, ejection devices are used, for example pneumatic devices, able to exert a thrust on the container, transversely to the direction of advancement of the conveyor belt, in order to push the container out of the conveyor belt, for example towards a second conveyor belt.

Plants are also known which have movable supports adapted to move special grippers comprising two or more clamps suitable for gripping the bottles, by acting, for example, onto the neck area immediately below the finish. A plant of the aforementioned type is described, for example, in document U.S. Pat. No. 2,899,232, in which grippers are used to position the bottles on a conveyor belt.

A problem related to the use of these grippers is due to the fact that, upon gripping the bottles, these can be on the conveyor belt in a position different from the expected one. This is due to the movement of the bottles along the (horizontal) plane of the conveyor belt during their advancement, for example due to vibrations, accelerations or slowdowns transmitted from the conveyor belt to the bottles.

A further problem, which also occurs when the grippers have to grip the bottles, is due to the fact that the bottles could be with their longitudinal (vertical) axis not perfectly perpendicular to the plane of the conveyor belt. This could be due, for example, to defects in the bottoms of the bottles or to accelerations and decelerations of the conveyor belt.

The document U.S. Pat. No. 3,856,343 describes a bottle gripping device comprising a collar, made of elastic material, said collar being able to receive the head of a bottle and being surrounded by a rigid sleeve. The collar comprises a cylindrical upper portion, consisting of an inner wall and an outer wall spaced radially and connected at intervals by means of webs. The upper portion is connected at the bottom to a frustoconical portion which widens outwards in the direction from top to bottom. By introducing a pressure medium between the inner and outer walls of the upper portion, the inner wall, deforming inwards, is able to tighten around the head of the bottle and thus grip it.

Although the frustoconical portion of the collar makes it possible to guide the bottles when they are to be gripped, the aforementioned gripping device does not effectively solve the problem of the inclination of the longitudinal axis of the bottles with respect to the direction perpendicular to the surface on which they stand.

The main object of the present invention is to overcome the drawbacks of the prior art, by providing a device for gripping bottles and a corresponding method which allow to grip and release bottles, in particular bottles which advance on a conveyor belt and which may have undergone movements along the plane of the conveyor belt or are inclined with respect to the perpendicular to the plane of the conveyor belt.

A further object of the present invention is to provide a device for gripping bottles which allows a screw cap applied to the gripped bottle to be subjected to verification of the removal torque without having to release the bottle.

These and other objects are achieved by the device for gripping bottles and the method for gripping and releasing bottles as claimed in the appended claims.

DISCLOSURE OF THE INVENTION

A gripping device according to the invention comprises clamps adapted to engage onto a container, more particularly a bottle. Preferably, the clamps are adapted to engage onto a neck of the bottle, more preferably in a region below a finish of the bottle. The gripping device further comprises a centring cone, preferably made as a component separate from and independent of the clamps and adapted to receive therein a bottle cap, for example a screw cap or plug-like cap.

The centring cone has a longitudinal axis and comprises an inlet mouth for entrance of the cap, and an inner lateral surface. The inner lateral surface comprises a first, substantially cylindrical portion and a second portion comprised between the first portion and the inlet mouth and diverging outwards in a direction from the first portion to the inlet mouth. More particularly, the first portion (upper portion) has a diameter such that it can fit onto the cap, i.e. receive the cap by adhering to the lateral surface thereof, and the second portion (lower portion) has an increasingly larger diameter with respect to the cap from the first portion to the inlet mouth, which has an inner diameter larger than that of the second portion and preferably rounded edges.

Advantageously, the centring cone, by means of the inlet mouth and the second portion, allows to center the bottle cap with respect to the longitudinal axis of the centring cone. In fact, the diameter of the inlet mouth, which is considerably larger than that of the cap, and the divergent geometry of the second portion allow, when the plug is not perfectly centered, to guide it, while it enters the centering cone, towards the center of the centring cone, i.e. towards the longitudinal axis thereof.

In addition, advantageously, the centring cone, by means of the first portion, allows to straighten the axis of the bottle, thus aligning it with respect to the longitudinal axis of the centring cone. In fact, the diameter of the first portion allows said portion, during insertion of the cap therein, to fit onto the cap, so that, if the cap and, therefore, the bottle are with their axis inclined with respect to the longitudinal axis, the first portion is able to align the cap and the bottle by rotating their axis until it is brought to coincide with the longitudinal axis of the centring cone.

The first portion of the centring cone also advantageously allows to keep the bottle aligned even during the phase in which the clamps disengage from the bottle, preventing them from remaining constrained to the neck of the bottle and dragging it with them and thereby misaligning the bottle.

The centring cone is preferably made of a substantially rigid material, i.e. it has a stiffness such as to allow the cap to be aligned when the cap is fitted therein, without deforming or deforming only to a negligible extent. Moreover, the inlet mouth and the internal lateral surface of the centring cone preferably have a low friction coefficient at least in the vertical direction.

Advantageously, the gripping device with clamps and centring cone separate from and independent of each other, by separating the clamping functions performed by the clamps from the centring and aligning functions performed by the centring cone, allows to obtain a more reliable device, in which the centring cone, which is substantially rigid, performs its functions optimally.

The first portion of the inner lateral surface of the centring cone is provided, optionally, with a knurled region so as to be able to match with a knurled region of the bottle cap. In this case, the centring cone is mounted, preferably rotatably mounted, in the gripping device and is integrally connectable to a measuring unit for measuring the removal torque for removing the cap from the bottle. This advantageously allows to measure the removal torque without the need for the gripping device to place the bottle at a dedicated measuring device.

The invention further relates to a method for gripping and releasing containers by means of the gripping device.

The gripping method comprises the steps of:
  bringing the gripping device to a position above a bottle to be gripped,
  lowering the gripping device, with its clamps open, onto the bottle to be gripped,
  inserting the cap of the bottle into the centring cone through the inlet mouth of the centring cone, and guiding the cap towards the center of the centring cone by means of the second portion of the inner lateral surface of the centring cone if the cap of the bottle is offset relative to the centring cone,
  fitting the cap into the first portion of the centring cone, and aligning the cap and the bottle by rotating the axis of the bottle until said axis is brought to coincide with the longitudinal axis of the centring cone if the axis of the container is inclined relative to the longitudinal axis of the centring cone,
  bringing the clamps into engagement onto the bottle, preferably onto the neck of the bottle.

At this point the gripping device can be lifted to direct the bottle towards its destination.

Optionally, when the first portion of the inner lateral surface of the centring cone is provided with a knurled region, the method comprises the additional step of:
  matching the knurled region of the first portion with the knurled region of the cap by compensating for any misalignment between said knurled region of the first portion and said knurled region of the cap, by means of the rotation of the container and/or of the centring cone about their respective axes.

If the bottle advances on a conveyor belt, during the aforementioned steps the gripping device is advanced at a speed equal to that of the conveyor belt.

The releasing method comprises the steps of:
  bringing the gripping device, with its clamps closed, clamped on a container, to a position in which the bottle is to be released;
  causing opening of the clamps and simultaneously vertically lifting the gripping device;
  causing sliding, by means of the movement of the gripping device upwards, of an outer lateral surface of the cap on the substantially cylindrical portion of the inner lateral surface of the centring cone, and aligning the cap, and therefore the bottle, if the axis of the bottle is inclined relative to the longitudinal axis of the centring cone, by rotating the axis of the container until said axis is brought to coincide with the longitudinal axis of the centring cone;
  taking the cap of the bottle out of the centring cone with the axis of the bottle aligned relative to the longitudinal axis of the centring cone.

In this case, too, if the bottle advances on a conveyor belt, during the aforementioned steps the gripping device is advanced at a speed equal to that of the conveyor belt.

BRIEF DESCRIPTION OF THE FIGURES

These and other features and advantages of the present invention will become clear from the following description of preferred embodiments given by way of non-limiting example with reference to the attached drawings, in which:

FIG. 1 is a sectional view of the gripping device according to the invention, applied on a bottle;

FIG. 2 is a bottom perspective view of the centring cone of the gripping device according to the invention and of the head of a bottle;

FIG. 2a is a sectional view of a detail of FIG. 2;

FIGS. 3-5 are sectional views showing various steps of the gripping method according to the invention;

DESCRIPTION OF PREFERRED EMBODIMENTS

Figures 6, 7, 8:
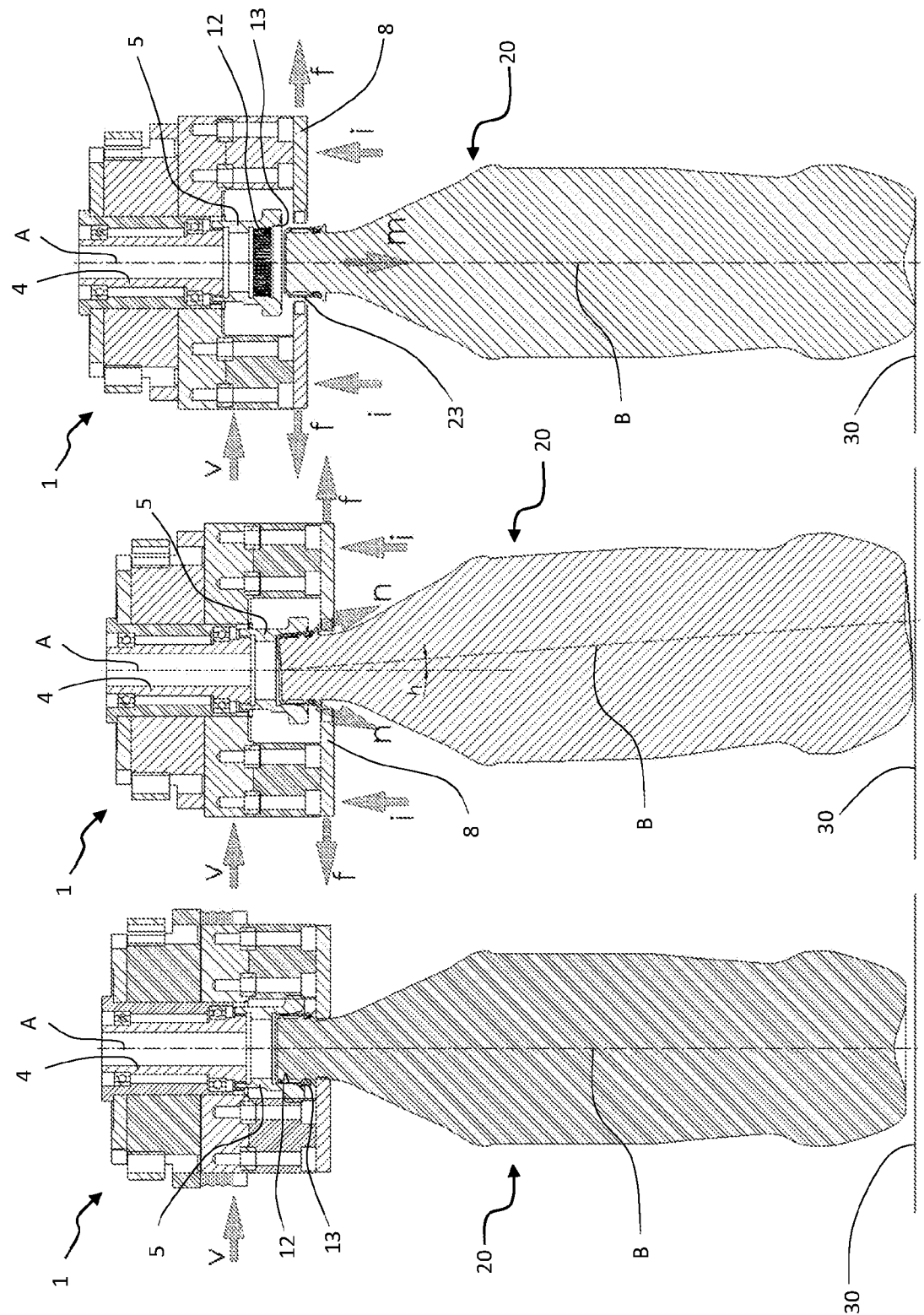
FIGS. 6-8 are sectional views showing various steps of the inserting method according to the invention.

Referring to FIG. 1, there is illustrated a gripping device 1 for gripping containers according to the invention, in particular for gripping bottles 20 having, in the region of their neck 21, a finish 22. The device 1 is associatable, in a known manner, to a mechanical arm, non shown in the figure, and is suitable for use in bottle carrying plants.

The gripping device 1 comprises a plurality of clamps 8, preferably arranged in the lower part of the device 1, said clamps being equispaced from one another and equidistant from a longitudinal axis A, and a centring cone 5 which is a component separate from and independent of the clamps 8 and is arranged above and coaxial to the clamps.

The clamps 8, of a known type, are configured to engage, with their ends 8a, on a bottle 20, preferably on the neck 21 of the bottle 20 in the region below the finish 22. In particular, the clamps 8, actuated by means of suitable control members, of a known type, can translate radially with respect to the longitudinal axis A, moving from a rest position to a working position and vice versa. In the rest position, the clamps 8 are open, i.e. they are in the farthest position with respect to the longitudinal axis A, so as to allow the passage of a bottle cap 23 and of the finish 22 of the bottle 20 through the space comprised between the ends 8a. In the working position the clamps 8 are closed, i.e. their ends 8a, that have come closer to each other, are in a position such that they engage onto the region below the finish 22 of the bottle 20.

The centring cone 5 is a hollow tubular element comprising, at its lower end, i.e. the end proximal to the clamps 8, an inlet mouth 10 arranged to allow introduction of the cap 23 into the centring cone 5. The centring cone 5 further has an inner lateral surface 11, which is preferably continuous at least in a circumferential direction, said inner lateral surface comprising a first portion 12 (upper portion), which is cylindrical or substantially cylindrical, and a second portion 13 (lower portion), comprised between the first portion 12 and the inlet mouth 10 and diverging outwards in the direction from the first portion 12 to the inlet mouth 10, i.e. from top to bottom in FIG. 1. In particular, the upper portion 12 has a diameter such that it can fit onto the cap 23, i.e. receive the cap 23 by adhering to the lateral surface thereof. Consequently, the lower portion 13 has an increasingly larger diameter with respect to the cap 23 from the upper portion 12 to the inlet mouth 10, which has an inner diameter larger than that of the lower portion 13 and preferably rounded edges 10a. Preferably, the inlet mouth 10 and the inner lateral surface 11 have a low friction coefficient at least in a vertical direction, with reference to FIG. 1.

Advantageously, the centring cone 5, by means of the inlet mouth 10 and the lower portion 13, allows to center the cap 23 of the bottle 20 relative to the longitudinal axis A. Indeed, the diameter of the inlet mouth 10, considerably larger than the diameter of the cap 23, and the diverging geometry of the lower portion 13 allow, when the cap 23 is not perfectly centered, to guide it, while it enters the centring cone 5, towards the center of the centring cone 5, i.e. towards the longitudinal axis A, thus allowing, specifically, an edge portion 25 of the cap 23 to slide along the lower portion 13 of the inner lateral surface 11.

In addition, advantageously, the centring cone 5, by means of the upper portion 12, allows to straighten the axis B of the bottle 20, thus aligning it relative to the longitudinal axis A of the centring cone 5. Indeed, the diameter of the upper portion 12 allows the upper portion 12, while the cap 23 is being inserted thereinto, to fit onto the cap 23 by sliding between the cap 23 and the upper portion 12. In this way, if the cap 23 and therefore the bottle 20 are with the axis B inclined relative to the longitudinal axis A of the centring cone 5, the upper portion 12 is capable of aligning the cap 23 and the bottle 20 by rotating their axis B until it is brought to coincide with the longitudinal axis A of the centring cone 5.

The upper portion 12 of the centring cone 5 also allows, advantageously, to align the bottle 20 even in those cases in which, during the step of releasing the bottle 20, said bottle is misaligned. This might happen, for example, because the clamps 8, when opening, might remain constrained to the neck 21 of the bottle 20 and entrain it with them, thus misaligning the bottle 20. In these cases, during exit of the cap 23 from the centring cone 5, the sliding of the outer lateral surface 24 of the cap 23 against the upper portion 12 of the centring cone 5 allows to re-align the cap 23, and thus the bottle 20, by rotating the axis B until it is brought to coincide with the longitudinal axis A of the centring cone 5.

The centring cone 5 is preferably made of a rigid or substantially rigid material, for example plastics or metal, so as to allow to align the cap when the cap is fitted inside the centring cone, without deforming or deforming only to a negligible extent.

The centring cone 5 can be mounted in the gripping device 1 in a fixed manner or, preferably, in a rotatable manner.

In the case where the centring cone 5 is rotatably mounted in the gripping device 1, it will be connectable, advantageously, to a measuring module, not shown in the figures, for measuring the removal torque for removing (or unscrewing) the cap 23 from the bottle 20. In addition, in this case, referring to FIGS. 2 and 2a, the upper portion 12 of the inner lateral surface 11 of the centring cone 5 will advantageously have a suitable knurled region 14 adapted to match with a knurled region 26 of the cap 23 of the bottle 20. In this way, the centring cone 5, actuated by the measuring module, will be able to impart a rotation to the cap 23.

Moreover, the centring cone 5, upon fitting onto the cap 23 of the bottle 20, allows the bottle 20, still free, to rotate so as to allow compensation of any misalignment between the knurled region 14 of the centring cone 5 and the knurled region 26 provided on the cap 23, thus allowing adequate coupling between the centring cone 5 and the cap 23 and avoiding damage and jamming relative to each other. In particular, the compensation of any misalignment between the knurled regions 14, 26 is even more effective when the centring cone 4 is mounted freely rotatable around the longitudinal axis A.

Preferably, the centring cone 5 is mounted in the gripping device 1 with an appropriate freedom of movement along the longitudinal axis A, so as to compensate for any tolerances in the height of the bottle and allow a suitable clearance during insertion of the cap 23 into the centring cone 5.

According to the embodiment shown in the figures, the connection between the centring cone 5 and the measuring module takes place by means of a rotating shaft 4 integrally connected to the centring cone 5, preferably at the upper end of the centring cone, i.e. at the distal end thereof with respect to the clamps 8. The shaft 4 is rotatably mounted in the gripping device 1, by suitable bearings 3, and, preferably, protrudes from the upper part of the gripping device 1, in order to be coupled, in a known manner, to the measuring module.

According to another embodiment, not shown, the centring cone is provided with an upper projection that passes longitudinally through the gripping device until it projects at the upper portion thereof. Such projection can then be coupled, in a known manner, to the measuring module.

In both the aforesaid embodiments, the measuring module acts onto the centring cone 5, either directly or through the rotating shaft 4, in order to unscrew the cap 23 by a certain angle, while the bottle 20 is kept locked by the clamps 8, and measure the torque required for effecting such unscrewing.

Advantageously, the embodiments of the gripping device 1 that provide for connecting the centring cone 5 to the measuring module for measuring the removal torque for removing the cap allow to check the removal torque without the need for the gripping device 1 to put down the bottle 20 at a dedicated measuring device.

FIGS. 3-5 show various steps of the method for gripping bottles, in particular from a conveyor belt 30, by using the gripping device 1.

When the gripping device 1 has to pick up a bottle 20 which advances on a conveyor belt 30, said gripping device 1, guided by the mechanical arm, is brought into position above this bottle 20 and, with the longitudinal axis A arranged perpendicularly with respect to the conveyor belt 30 and with the clamps 8 in the rest position, it is lowered vertically, i.e. along the longitudinal axis A (FIG. 3), while at the same time it is advanced at a speed v equal to that of the conveyor belt 30.

The lowering of the gripping device 1 (indicated by the arrows b) continues, still simultaneously with the advancement at the speed v, thus determining the entrance of the cap 23 of the bottle 20 into the centring cone 5 through the inlet mouth 10. In this step, if the cap 23 of the bottle 20 is offset relative to the centring cone 5, i.e. relative to the longitudinal axis A, the lower portion 13 of the inner lateral surface 11 of the centring cone 5, by lowering itself, guides the cap 23 towards the center of the centring cone 5, i.e. towards the longitudinal axis A.

The further lowering of the centring cone 5 (which continues to advance at the same speed as the conveyor belt 30) therefore determines the insertion of the cap 23 of the bottle 20 into the upper portion 12 of the centring cone 5. In particular, the upper portion 12 fits on the cap 23, so that, if the cap 23 and, therefore, the bottle 20 are with their axis B inclined with respect to the longitudinal axis A of the centring cone 5 (FIG. 4), such upper portion 12 aligns the cap 23 and the bottle 20 by rotating their axis B until it is brought to coincide with the longitudinal axis A of the centring cone 5.

In the aforesaid step, if the upper portion 12 is provided with a knurled region 14, any misalignment between this knurled region 14 and the knurled region 26 of the cap 23 will be initially compensated, thanks to the rotation of the bottle 20 and/or of the centring cone 5 around their respective axes. Therefore, once the insertion has been completed, the knurled region 26 of the cap 23 will be coupled with the knurled region 14 of the upper portion 12 of the centring cone 5.

In a subsequent step, when the bottle 20 is aligned with the centring cone 5 of the gripping device 1, while the gripping device 1 continues to advance at the same speed as the conveyor belt 30, the clamps 8 move to a working position (movement indicated by means of arrows e) and come into engagement onto the bottle, preferably onto the neck 21 of the bottle 20, for example in the region below the finish 22 (FIG. 5).

At this point, the mechanical arm can lift the gripping device 1 and move the bottle 20 away from the conveyor belt 30 to transfer it to another area, as needed. In this handling step, advantageously, the centring cone 5, by providing, thanks to its geometry and structure, greater constraints along the longitudinal axis A and in the plane perpendicular thereto, allows to increase the resistant moment of inertia.

FIGS. 6-8 show various steps of the method for releasing bottles, in particular onto a conveyor belt 30, by using the gripping device 1.

When the gripping device 1 which has previously gripped a bottle 20 must insert it onto an advancing conveyor belt 30, said gripping device 1, guided by the mechanical arm, is brought into position over a free space of the conveyor belt 30 and, with its longitudinal axis A arranged substantially perpendicular with respect to the conveyor belt 30, is lowered vertically, i.e. along the longitudinal axis A, while at the same time it is advanced at a speed v equal to that of the conveyor belt 30 (FIG. 6).

In the aforementioned step, the bottle 20 could be in contact with the conveyor belt 30 or, due to dimensional tolerances in the height of the bottle, in a raised position (without contact) with respect to the conveyor belt 30.

In a subsequent step (FIG. 7), the gripping device 1, continuing to advance at the speed v, is lifted vertically (movement indicated by arrows i) and at the same time the clamps 8 move to their rest position (movement indicated by arrows f).

In the aforesaid step, opening of the clamps 8 can cause the misalignment of the bottle 20 in the case in which some clamps, remaining constrained to the neck 21 of the bottle 20, drag said bottle with them (FIG. 7). The aforementioned misalignment is more likely if the bottle 20 is in a raised position with respect to the conveyor belt 30.

The movement of the gripping device 1 upwards and, if the bottle 20 is in a raised position, the movement of the bottle 20 downwards (indicated by arrows n), by gravity, cause sliding of the outer lateral surface 24 of the cap 23 over the upper portion 12 of the inner lateral surface 11 of the centring cone 5. Such sliding, if the bottle 20 is with its axis B inclined with respect to the longitudinal axis A of the centring cone 5, is able to realign the cap 23, and therefore the bottle 20, by rotating the axis B until it is brought to coincide with the longitudinal axis A of the centring cone 5.

At this point, while the gripping device 1 continues to advance at a speed v and to rise vertically, the cap 23 of the bottle 20 comes out of the centring cone 5 (movement indicated by arrow m) with the axis B of the bottle 20 in a position aligned with the longitudinal axis A of the centring cone 5, or in a position substantially perpendicular to the plane of the conveyor belt 30 (FIG. 8).

Figure 9:
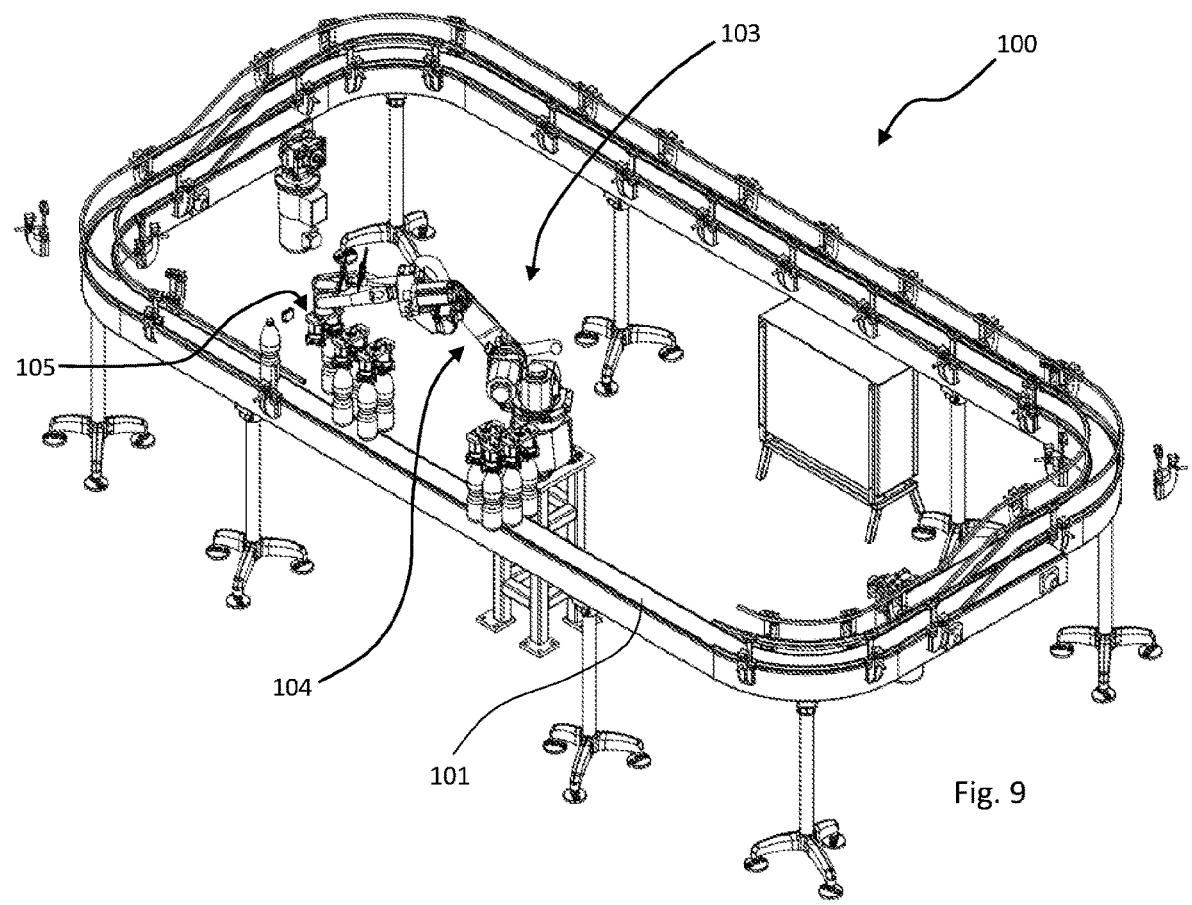
FIG. 9 is a perspective view of a container conveying plant comprising an apparatus for transferring containers from/onto a conveyor belt, wherein the apparatus is equipped with gripping devices according to the present invention.

Referring to FIG. 9, an example of application of the gripping device 1 and of the gripping and releasing method according to the invention to a conveying plant 100 for containers is described below.

The conveying plant 100 comprises a conveyor belt 101 on which containers, more particularly bottles 20, are advanced aligned with and close to one another.

In order to maintain high productivity, the speed of advancement of the conveyor belt 101 is very high, for example greater than 1 m/s.

Figure 10:
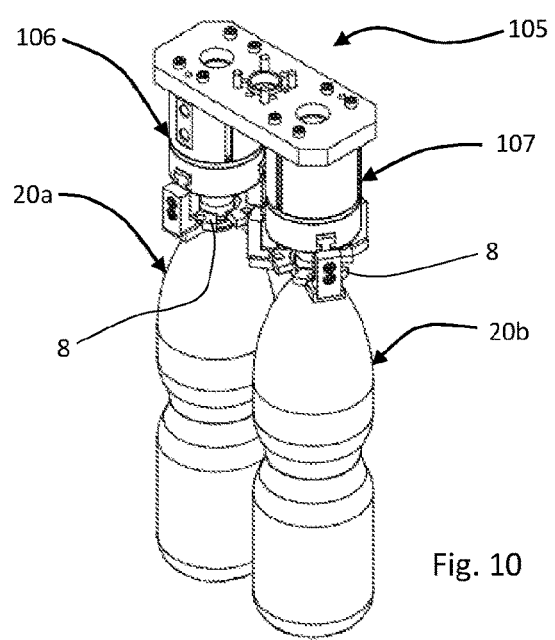
FIG. 10 is a perspective view of the head of the gripping apparatus of the conveying plant of FIG. 9, said head being equipped with two gripping devices according to the present invention.

The conveying plant 100 comprises a transferring apparatus 103 comprising a supporting arm 104 at the end of which a head 105 preferably equipped with two gripping devices 106, 107 according to the present invention is mounted (FIG. 10).

The supporting arm 104 can move the head 105 in a first direction substantially parallel to the direction of advancement of the conveyor belt 101 at the position in which the transferring apparatus 103 is arranged. In particular, the supporting arm 104 can move the head 105 in a direction substantially parallel to the direction of advancement of the conveyor belt 101 in a manner synchronized with the advancement of the conveyor belt 101. In this way, the head 5 can be maintained substantially at the same point as the conveyor belt 101 while the conveyor belt advances at high speed.

In addition, the supporting arm 104 can move the head 105 in a second direction transverse to the direction of advancement of the conveyor belt 101 at the position in which the transferring apparatus 103 is arranged. In this way, the head 105 can be brought from a first position, in which a first gripping device 106 is aligned with the conveyor belt 101 to pick up a first bottle 20a from the conveyor belt, to a second position in which a second gripping device 107 is aligned with the conveyor belt 101 to insert a second bottle 20b onto the conveyor belt, in the space left empty by the first bottle 20a.

The supporting arm 104 will also be movable along a third direction, perpendicular to the plane on which the conveyor belt 101 lies, in order to lower itself with respect to the conveyor belt 101 to grip the first bottle 20a to be picked up and lift with respect to the conveyor belt 101 after it has released the second 20b bottle to be inserted.

FIGS. 11a-11e show various steps of a bottle transfer process 20, in which the gripping and releasing method according to the present invention is applied.

Figure 11A:
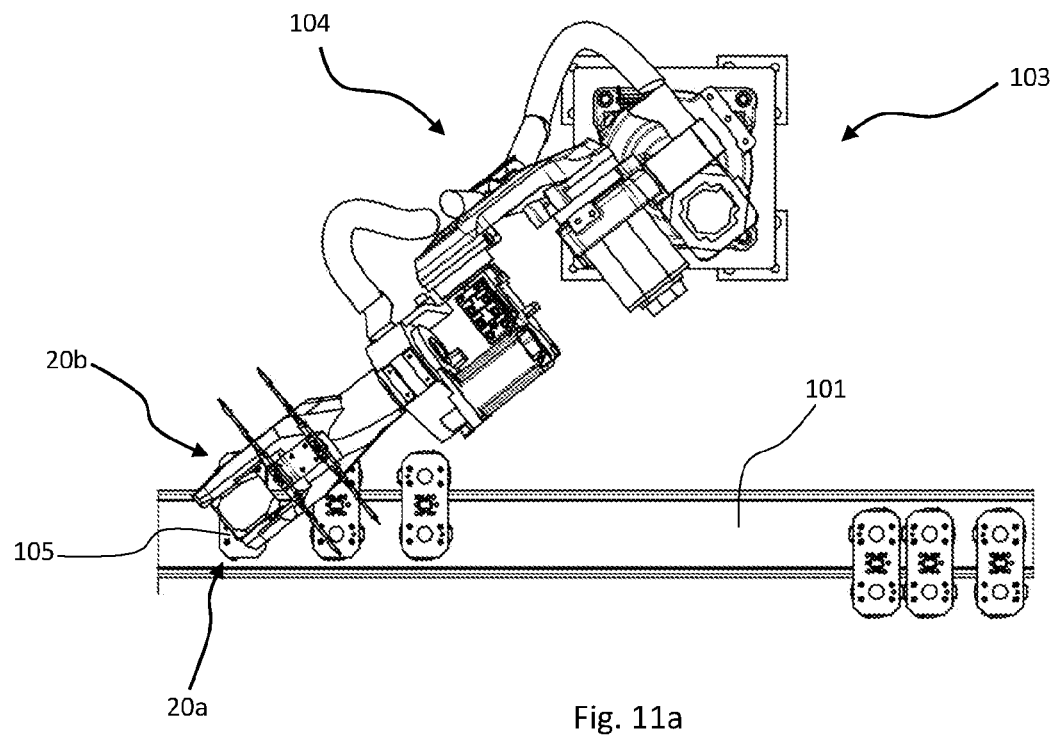
FIGS. 11a-11e are top views showing various steps of a process of transferring containers in the plant of FIG. 9, in which the gripping and releasing method of the present invention is applied.

In a first step, illustrated in FIG. 11a, the supporting arm 104 of the transferring apparatus 103 moves the head 105 at the same speed as the conveyor belt 101 so that the first gripping device 106 is aligned with the conveyor belt 101 and is located above the top of a bottle 20a which is advancing on the conveyor belt 101. In this first step, the clamps 8 of the first gripping device 106 are in the rest position, i.e. open, and do not carry any bottles, while the clamps 8 of the second gripping device 107 are in the working position, i.e. closed, and are tightened on the neck of the bottle 20b.

Figure 11B:
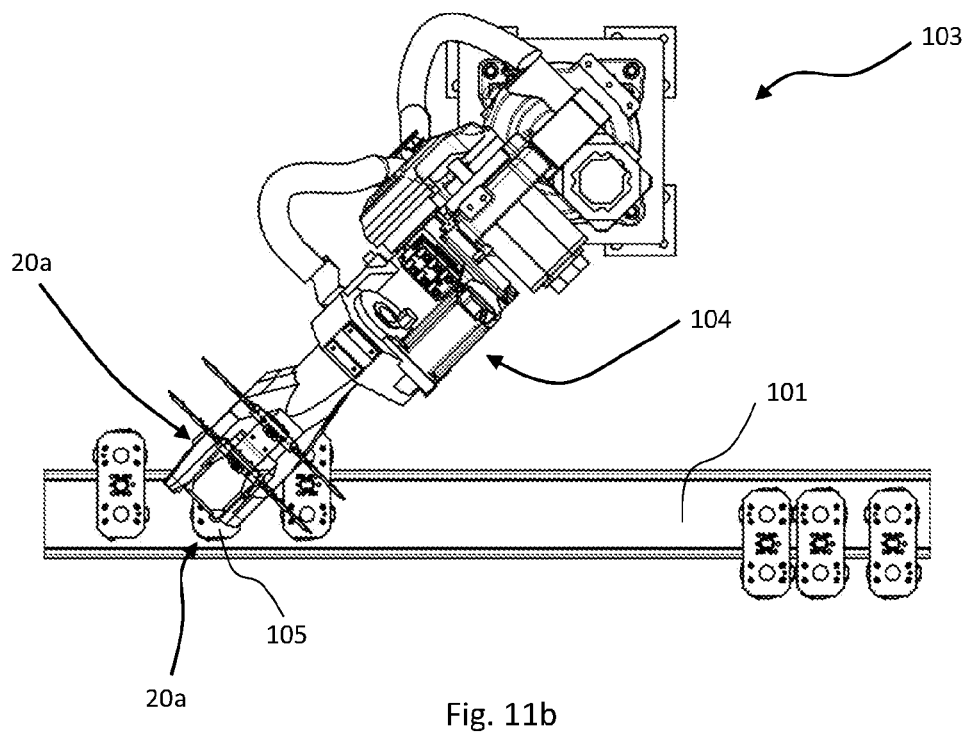

In a second step, illustrated in FIG. 11b, the supporting arm 104, moving in a direction parallel to and at the same speed as the conveyor belt 101, by lowering itself with respect to the conveyor belt 101 and the first gripping device 106 grasps the bottle 20a in accordance with the previously described gripping method.

Figure 11C:
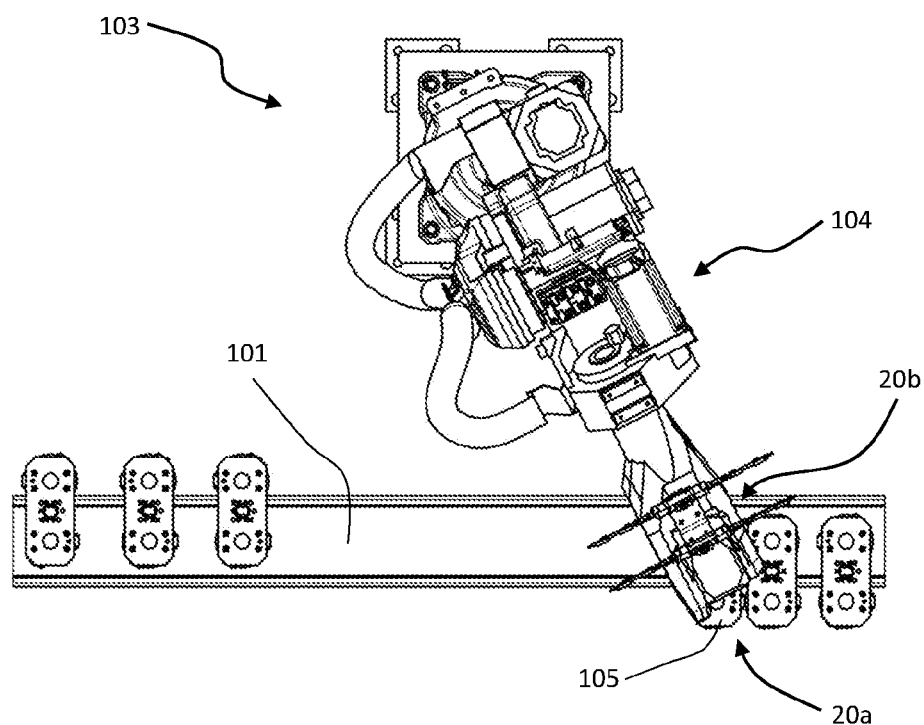

In a third step, illustrated in FIG. 11c, the supporting arm 104, still moving the head 105 in a direction substantially parallel to and at the same speed as the conveyor belt 101, after having lifted this head 105 sufficiently, moves it in a second direction, transversely with respect to the conveyor belt 101, so as to bring the second gripping device 107 (and with it the bottle 20b to be inserted onto the conveyor belt) in alignment with the conveyor belt 101.

Thanks to the fact that the supporting arm 104 moves at the same speed as the conveyor belt 101, the bottle 20b carried by the second gripping device 107 will occupy exactly the empty space previously occupied by the bottle 20a just picked up by the first gripping device 106.

Figure 11D:
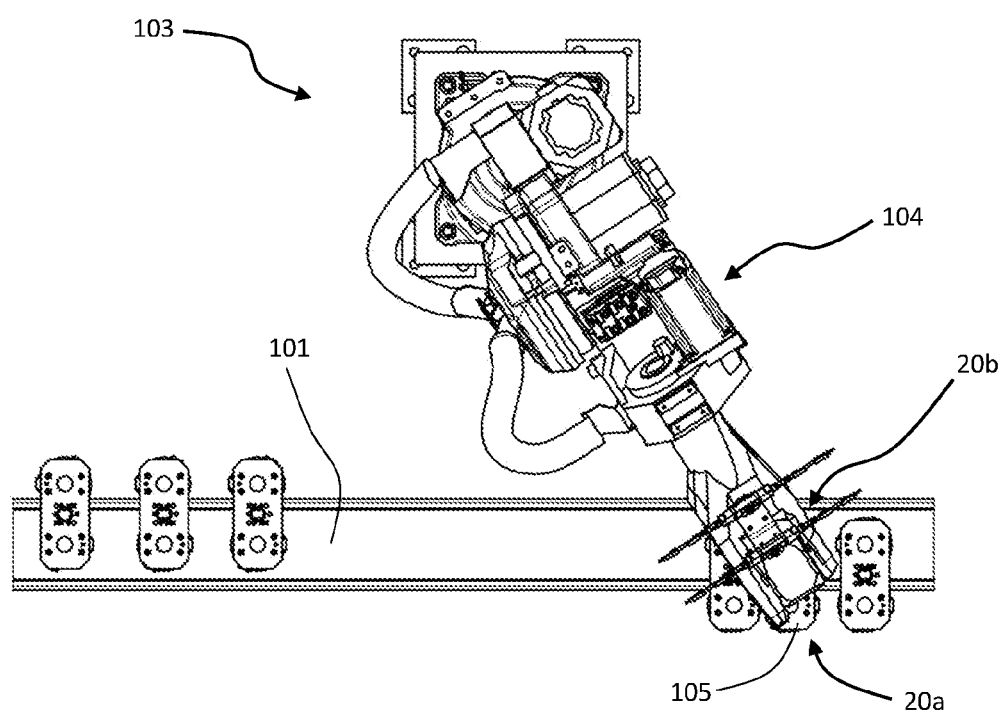

In a fourth step, illustrated in FIG. 11d, the second gripping device 107 releases the bottle 20b according to the previously described releasing method.

Figure 11E:
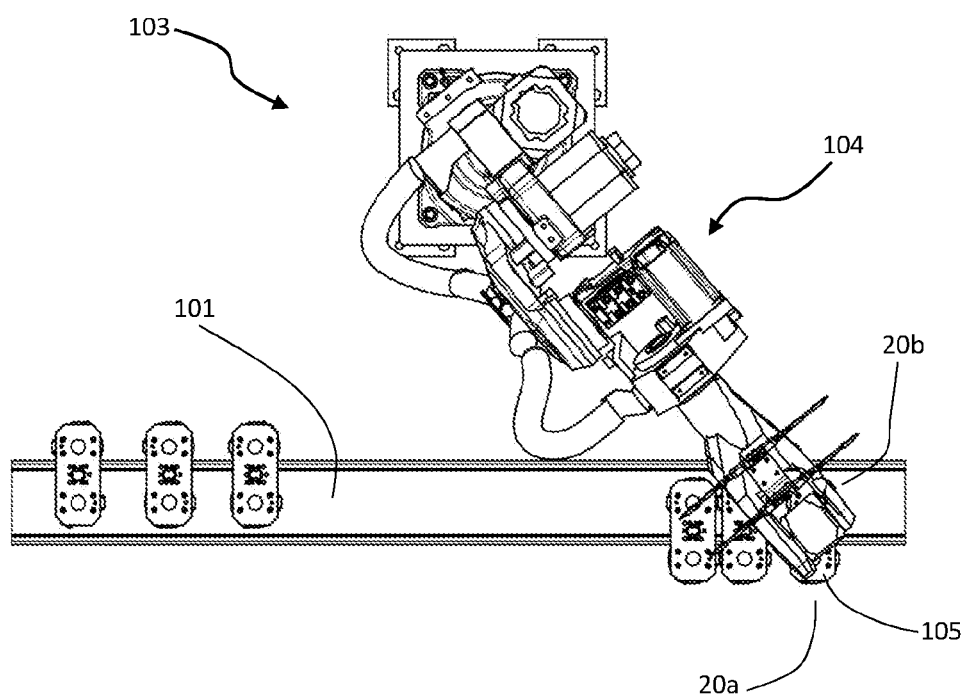

In a fifth and last step, illustrated in FIG. 11e, the supporting arm 104 lifts again with respect to the conveyor belt 101 so as to transfer the bottle 20a picked up from the conveyor belt 101 without interfering with the advancement of the other bottles. In this step, the clamps 8 of the second gripping device 107 are in the rest position and do not carry any bottles, while the clamps 8 of the first gripping device 106 are in the working position, tightened on the neck of the bottle 20a.

In FIG. 9 and in each of the FIGS. 11a-11e, besides the head 105 mounted on the supporting arm 104, also the heads in the other steps of the transfer process have been shown, in order to highlight the movements of the head during this process.

From the above description it will be apparent to the person skilled in the art that the gripping device and the gripping and releasing method according to the invention allow to effectively achieve the objects set forth above.

It will also be evident to the person skilled in the art that the embodiments as described and illustrated are not to be intended in any way in a limiting sense and numerous variations and modifications within the reach of the person skilled in the art are possible and in any case fall within the scope of protection of the present invention as defined by the appended claims.

The invention claimed is:

1. A device for gripping containers, comprising clamps (8) adapted to clamp a container (20), and a centring cone (5) adapted to receive a cap (23) of the container (20), said centring cone (5) having a longitudinal axis (A) and comprising an inlet mouth (10), for entrance of said cap (23), and an inner lateral surface (11), said inner lateral surface (11) comprising a first, substantially cylindrical portion (12) and a second portion (13) comprised between the first portion (12) and the inlet mouth (10) and diverging outwards in the direction from the first portion (12) to the inlet mouth (10), wherein the centring cone (5) is a component separate from and independent of the clamps (8), and wherein the centring cone (5) is rotatably mounted in the device for gripping containers.

2. The device according to claim 1, wherein the first portion (12) of the inner lateral surface (11) of the centring cone (5) has a knurled region (14) so as to be able to match with a knurled region (26) of the cap (23) of the container (20).

3. The device according to claim 1, wherein the centring cone (5) can be integrally connected to a measuring unit for measuring a torque for removing the cap (23) from the container (20).

4. The device according to claim 1, wherein the centring cone (5) is made of a substantially rigid material so that it is not deformed or is deformed only to a negligible extent, when the cap (23) of the container (20) is fitted thereinto.

5. A plant for conveying containers (20a, 20b), comprising a conveyor belt (101) on which the containers (20a, 20b) are advanced, and a transferring apparatus (103) comprising a supporting arm (104) at the end of which a head (105) having at least one gripping device (106, 107) according to claim 1.

6. A method of gripping a container (20) having a cap (23) located on a conveyor for removal therefrom by means of a gripping device (1) comprising clamps (8) and a centring cone (5) having a longitudinal axis (A), said centring cone (5) comprising an inlet mouth (10) and an inner lateral surface (11); wherein the inner lateral surface (11) comprises a first, substantially cylindrical portion (12) and a second portion (13) comprised between the first portion (12) and the inlet mouth (10) and diverging outwards in the direction from the first portion (12) to the inlet mouth (10), said method comprising the steps of:

bringing the gripping device (1) to a position above a container (20) to be gripped, lowering the gripping device (1) with its clamps (8) open, onto the container (20), inserting the cap (23) of the container (20) into the centring cone (5) through the inlet mouth (10) of the centring cone (5), and guiding the cap (23) towards the center of the centring cone (5) by means of the second portion (13) of the inner lateral surface (11) of the centring cone (5) if the cap (23) of the container (20) is offset relative to the centring cone (5), fitting the cap (23) into the first portion (12) of the centring cone (5), and aligning the cap (23), and therefore the container (20), by rotating the axis (B) of the container (20) until said axis (B) is brought to coincide with the longitudinal axis (A) of the centring cone (5) if the axis (B) of the container (20) is inclined relative to the longitudinal axis (A) of the centring cone (5), bringing the clamps (8) into engagement with the container (20).

7. The method according to claim 6, wherein the first portion (12) of the inner lateral surface (11) of the centring cone (5) has a knurled region (14), said method comprising the additional step of:

matching the knurled region (14) of the first portion (12) with a knurled region (26) of the cap (23) by compensating for any misalignment between said knurled region (14) of the first portion (12) and said knurled region (26) of the cap (23), by means of the rotation of the container (20) and/or of the centring cone (5) about their respective axes (A, B).

8. The method according to claim 6, wherein the gripping device (1), during the aforesaid steps, is advanced at a speed (v) equal to a speed of a conveyor belt (30) on which the container (20) stands.

9. A method of releasing a container (20) having a cap (23) from a gripping device (1) onto a surface, the gripping device (1) comprising clamps (8) and a centring cone (5) having a longitudinal axis (A), said centring cone (5) comprising an inner lateral surface (11) comprising a substantially cylindrical portion (12), said method comprising the steps of:

bringing the gripping device (1), with its clamps (8) closed, clamped on a container (20), to a position in which the container (20) is to be released;

causing opening of the clamps (8) and simultaneously vertically raising the gripping device (1);

causing sliding, by means of the movement of the gripping device (1) upwards, an outer lateral surface (24) of the cap (23), on the substantially cylindrical portion (12) of the inner lateral surface (11) of the centring cone (5), and aligning the cap (23), and therefore the container (20), if the axis (B) of the container (20) is inclined relative to the longitudinal axis (A) of the centring cone (5), by rotating the axis (B) of the container (20) until said axis (B) is brought to coincide with the longitudinal axis (A) of the centring cone (5);

taking the cap (23) of the container (20) out of the centring cone (5) with the axis (B) of the container (20) aligned relative to the longitudinal axis (A) of the centring cone (5).

10. The method according to claim 9, wherein the gripping device (1), during the aforesaid steps, is advanced at a speed (v) equal to a speed of a conveyor belt (30) on which the container (20) stands.

* * * * *